(12) United States Patent
Lim et al.

(10) Patent No.: US 7,753,088 B2
(45) Date of Patent: Jul. 13, 2010

(54) SYSTEM AND METHOD FOR FILLING HYDRODYNAMIC BEARINGS WITH FLUID

(75) Inventors: Tae Hyeong Lim, Gyunggi-do (KR); Ho Kyung Jang, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 805 days.

(21) Appl. No.: 11/700,778

(22) Filed: Feb. 1, 2007

(65) Prior Publication Data
US 2007/0227615 A1 Oct. 4, 2007

(30) Foreign Application Priority Data
Mar. 15, 2006 (KR) ...................... 10-2006-0024020

(51) Int. Cl.
*B65B 31/00* (2006.01)
*F16C 32/06* (2006.01)

(52) U.S. Cl. .................. 141/59; 141/5; 141/7; 141/65; 384/100

(58) Field of Classification Search ...................... 141/4, 141/5, 7, 59, 65, 67; 384/100; 184/109
See application file for complete search history.

(56) References Cited

U.S. PATENT DOCUMENTS

| | | | | |
|---|---|---|---|---|
| 5,112,142 A | * | 5/1992 | Titcomb et al. | ............. 384/107 |
| 5,601,125 A | * | 2/1997 | Parsoneault et al. | ............ 141/51 |
| 5,778,948 A | * | 7/1998 | Gomyo et al. | ................. 141/7 |
| 5,862,841 A | * | 1/1999 | Wuester, Sr. | ................ 141/284 |
| 6,305,439 B1 | * | 10/2001 | Pool et al. | ....................... 141/4 |
| 6,804,987 B2 | * | 10/2004 | Kloeppel et al. | ............... 73/10 |
| 6,907,769 B2 | * | 6/2005 | Aiello et al. | .................... 73/37 |
| 7,048,444 B2 | * | 5/2006 | Kurimura et al. | ........... 384/119 |
| 7,144,160 B2 | * | 12/2006 | Kimura | ....................... 384/12 |
| 7,153,028 B2 | * | 12/2006 | Oelsch | ....................... 384/100 |
| 7,344,002 B2 | * | 3/2008 | Neumann et al. | ............ 184/5.1 |

FOREIGN PATENT DOCUMENTS

| | | |
|---|---|---|
| JP | 2-501846 | 6/1990 |
| JP | 4-171412 | 6/1992 |
| JP | 2001-165153 | 6/2001 |
| JP | 2002-005170 | 1/2002 |
| JP | 2004-176796 | 6/2004 |
| JP | 2005-114051 | 4/2005 |
| WO | WO 89/01573 | 2/1989 |

OTHER PUBLICATIONS

Korean Patent Office Action, mailed Feb. 23, 2007, and issued in priority Korean Patent Application No. 10-2006-0024020.
Japanese Office Action dated May 26, 2009 and issued in corresponding Chinese Patent Application 2007-051144.

* cited by examiner

*Primary Examiner*—Timothy L Maust

(57) ABSTRACT

A system and method for filling hydrodynamic bearings with fluid. The fluid filling system includes a vacuum vessel for receiving the hydrodynamic bearing therein, a pump hermetically connected to the vacuum vessel and exhausting air from the vacuum vessel to the outside, an ultrasonic generator for generating vibrations in the vacuum vessel, and a fluid dispenser for dripping the fluid into the hydrodynamic bearing. When air is exhausted from the vacuum vessel to the atmosphere by the pump, the hydrodynamic bearing is vibrated by the ultrasonic generator and air is exhausted from a micro-gap between the shaft and sleeve of the bearing the atmosphere.

18 Claims, 5 Drawing Sheets

SYSTEM AND METHOD FOR FILLING HYDRODYNAMIC BEARINGS WITH FLUID

CROSS REFERENCE TO RELATED APPLICATION(S)

This application claims the benefit of Korean Patent Application No. 10-2006-0024020, filed on Mar. 15, 2006, entitled System and Method for Filling Fluid into Hydrodynamics Bearings, which is hereby incorporated by reference in its entirety into this application.

BACKGROUND OF THE INVENTION

1. Field of the Invention

The present invention relates, in general, to a system and method for filling hydrodynamic bearings with fluid and, more particularly, to a system and method for filling hydrodynamic bearings with fluid, which can completely eliminate air bubbles from micro-gaps in the hydrodynamic bearings and prevent the infiltration of air bubbles in fluid charged in the bearings.

2. Description of the Related Art

Generally, hydrodynamic bearings are devices used in motors of Hard Disk Drives or CD-Drives. A hydrodynamic bearing includes a shaft and a sleeve, with viscous fluid, such as oil, charged in a micro-gap between the shaft and the sleeve to support free rotation of the shaft due to dynamic pressure formed in the fluid during rotation of the shaft relative to the sleeve.

To fill the micro-gap between the shaft and the sleeve of the hydrodynamic bearing with fluid, the fluid is charged in the bearing such that air bubbles are not formed in the fluid and surplus fluid does not remain around the bearing. However, filling such a bearing with fluid is very difficult, and requires a complicated procedure.

A conventional method for filling such hydrodynamic bearings with fluid is disclosed in Japanese Patent Laid-open Publication No. 2002-5170 and is shown in FIGS. 4A through 4D of the accompanying drawings.

To fill a hydrodynamic bearing with fluid according to the conventional fluid filling method, lubrication oil 25 is supplied into a gap between a shaft 2 and a plate 3, as shown in FIG. 4A. During the oil supply step, the bearing 1 is rotated at a low speed and, thereafter, the dispenser 4 comes into contact with the shaft 2 and then drips lubrication oil 25 onto an area around the inlet of the gap.

Thereafter, as shown in FIG. 4B, the bearing 1, onto which the lubrication oil 25 has been dripped, is inserted into a hermetic vacuum vessel 7 prior to exhausting air from the vacuum vessel 7 to the atmosphere using a vacuum pump, as shown by the arrow 6 in the drawing to place the vessel 7 in a vacuum state. In the above state, the surplus air remaining in the gap of the bearing 1 is removed from the bearing 1 in the form of air bubbles.

As shown in 4c, a throttle valve 24 is opened to supply air into the vacuum vessel 7 and allow the internal pressure of the vessel 7 to gradually return to atmospheric pressure. In the above state, the lubrication oil 25 is pressurized by the inlet air of the vacuum vessel 7, so that the oil 25 flows to the corners of the gap and is forced under pressure into the gap. Furthermore, after the lubrication oil 25 has been forced into the gap, the small quantity of air bubbles remaining in the lubrication oil 25 can be reduced by maintaining the temperature of the vacuum vessel 7 at 60° C. or higher.

Thereafter, as shown in FIG. 4D, while the bearing 1 is rotated at a low speed, the surplus lubrication oil 25 is sucked under reduced pressure from the gap of the bearing 1 using a pipe 14, as shown by the arrow 10 in the drawing.

However, the above-mentioned conventional fluid filling method is problematic in that the lubrication oil 25 must be charged under pressure into the gap without removing air from the gap of the bearing 1, so that the air cannot be completely removed from the gap and, furthermore, the air may be introduced into the lubrication oil 25 while the air is exhausted from the gap.

Furthermore, after the lubrication oil 25 has been forced under pressure into the gap of the bearing 1, the temperature of the vacuum vessel 7 must be maintained at a predetermined point or higher to remove remaining air bubbles, which complicates the fluid filling procedure.

Furthermore, when air is drained from the vacuum vessel 7 using the vacuum pump 6, the lubrication oil 25, which has been dripped on the bearing 1, may fly, thus contaminating the surroundings.

SUMMARY OF THE INVENTION

Accordingly, the present invention has been made keeping in mind the above problems occurring in the related art, and an object of the present invention is to provide a system and method for filling a micro-gap between a shaft and a sleeve of a hydrodynamic bearing with fluid, in which the fluid is charged in the micro-gap after all of the air has been removed from the micro-gap, thus preventing air from infiltrating into the fluid charged in the micro-gap.

Another object of the present invention is to provide a system and method for filling a micro-gap between a shaft and a sleeve of a hydrodynamic bearing with fluid, which does not require that the temperature of the fluid charged in the micro-gap be maintained at a predetermined point or higher in order to remove air remaining in the fluid.

A further object of the present invention is to provide a system and method for filling a micro-gap between a shaft and a sleeve of a hydrodynamic bearing with fluid, in which, when the fluid is charged in the micro-gap, the fluid does not fly and thus contaminate the surroundings.

In order to achieve the above objects, according to one aspect of the present invention, there is provided a system for filling hydrodynamic bearings with fluid, comprising: means for receiving therein an object to be filled with the fluid; means for exhausting air from the receiving means to an outside; and means for generating vibrations in the receiving means, wherein the object is filled with the fluid while the object is vibrated by the vibration generating means.

In operation of the fluid filling system of the present invention, when air is exhausted from the receiving means through the exhausting means, the object may be vibrated by the vibration generating means and air may be exhausted from the object.

The fluid filling system of the present invention may further comprise: pressurizing means for supplying nitrogen to the receiving means and pressurizing the fluid charged in the object.

In an embodiment, the present invention provides a system for filling hydrodynamic bearings with fluid, comprising: a vacuum vessel to receive therein a hydrodynamic bearing to be filled with the fluid; a pump hermetically connected to the vacuum vessel and exhausting air from the vacuum vessel to an outside; an ultrasonic generator for generating vibrations in the vacuum vessel; and a fluid dispenser hermetically connected to the vacuum vessel and dripping the fluid into the hydrodynamic bearing, wherein the hydrodynamic bearing is filled with the dripped fluid while the hydrodynamic bearing is vibrated by the ultrasonic generator.

In operation of the fluid filling system, when the air is exhausted from the vacuum vessel by the pump, the hydrodynamic bearing may be vibrated by the ultrasonic generator and air may be exhausted from a micro-gap between a shaft and a sleeve of the hydrodynamic bearing to the outside.

The system may further comprise: a nitrogen storage tank to supply nitrogen to the vacuum vessel and pressurize the fluid charged in the hydrodynamic bearing.

The system may further comprise: an ultrasonic generation container, which is installed so as to be in contact with an upper surface of the ultrasonic generator, and which receives the vacuum vessel therein, wherein the vacuum vessel is spaced apart from an inner surface of a bottom wall of the ultrasonic generation container by a predetermined distance, with a medium charged in a space between the vacuum vessel and the ultrasonic generation container to transmit the ultrasonic waves to the vacuum vessel.

The ultrasonic waves generated by the ultrasonic generator may have a frequency band of not lower than 1 kHz.

In another aspect, the present invention provides a method for filling hydrodynamic bearings with fluid, comprising the steps of: taking a hydrodynamic bearing into a vacuum vessel and removing air from the vacuum vessel while generating vibrations in the hydrodynamic bearing; dripping fluid into a micro-gap of the hydrodynamic bearing using a fluid dispenser provided in the vacuum vessel; generating vibrations in the hydrodynamic bearing using ultrasonic waves generated by an ultrasonic generator, thus sufficiently filling the micro-gap with the dripped fluid; and supplying nitrogen into the vacuum vessel and pressurizing the fluid, thus completely filling the micro-gap with the fluid.

In the method, part of the fluid which has been dripped into the micro-gap at the step of dripping the fluid may permeate through the micro-gap due to capillary action, while a remaining part of the dripped fluid may permeate through the micro-gap when the hydrodynamic bearing is vibrated at the step of generating vibrations.

In the method, a medium may be charged in a gap between the vacuum vessel and the ultrasonic generator, and the ultrasonic waves generated by the ultrasonic generator may be transmitted both to the vacuum vessel and to the hydrodynamic bearing through the medium.

In the method, the ultrasonic waves generated by the ultrasonic generator may have a frequency band of not lower than 1 kHz.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
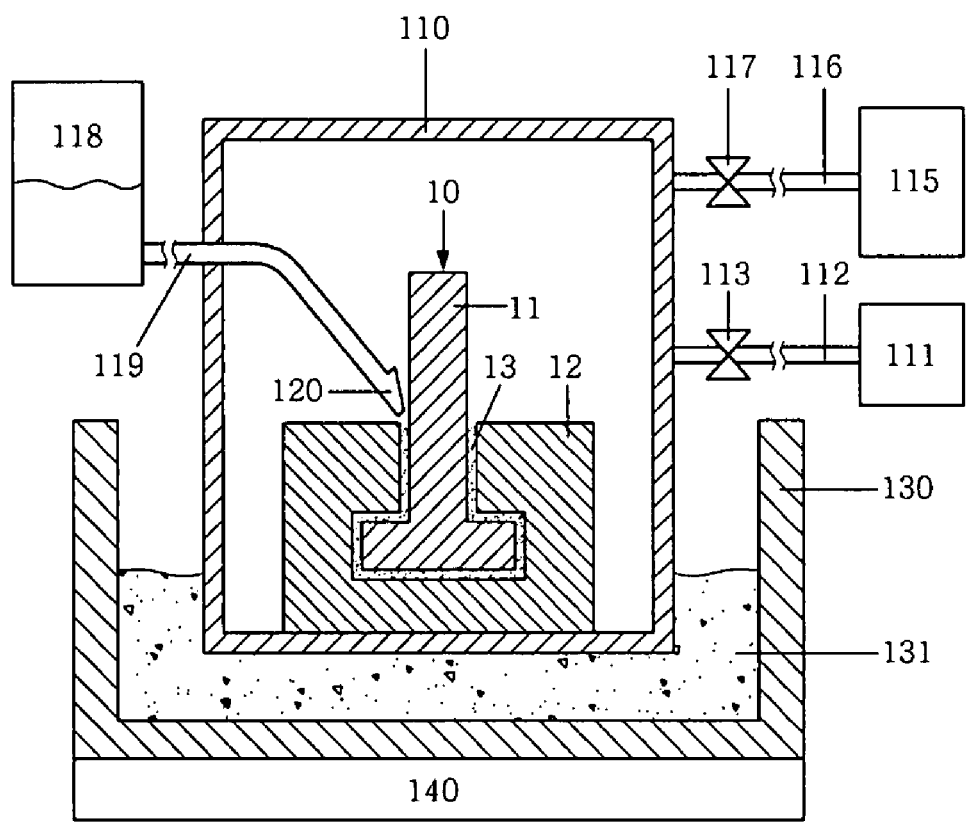
FIG. 1 is a schematic view illustrating a system for filling hydrodynamic bearings with fluid according to a preferred embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Hereinbelow, a fluid filling system 100 according to an embodiment of the present invention will be described in detail with reference to FIG. 1. For ease of description, only a shaft 11 and a sleeve 12 of the hydrodynamic bearing 10 are shown in detail in the drawing, while the other elements of the bearing 10 are not shown in detail, but are shown schematically. Furthermore, the micro-gap 13 between the shaft 11 and the sleeve 12 is shown very exaggeratedly, unlike the actual shape and size.

As shown in FIG. 1, the fluid filling system 100 comprises a vacuum vessel 110, a fluid dispenser 120, an ultrasonic generation container 130, and an ultrasonic generator 14.

The vacuum vessel 110 is the container that receives therein a hydrodynamic bearing 10 to fill the bearing 10 with fluid. An opening (not shown) is defined in a predetermined part, preferably, the upper part of the vacuum vessel 110, thus allowing a worker to put the bearing 10 into the vessel 110 or take it out.

Furthermore, a pump 111 to exhaust air from the vacuum vessel 110 and a nitrogen storage tank 115 to store and supply nitrogen to the vessel 10 are connected to respective portions of the vacuum vessel 110. The pump 111 is hermetically connected to the vacuum vessel 110 through an air exhaust pipe 112, while the nitrogen storage tank 115 is hermetically connected to the vacuum vessel 110 through a nitrogen supply pipe 116.

A fluid storage tank 118 for supplying fluid to the vacuum vessel 110 is connected to another side of the vacuum vessel 110. A fluid supply pipe 119, which is hermetically connected to the fluid storage tank 118, extends into the vacuum vessel 110.

The fluid dispenser 120 for dripping fluid onto the hydrodynamic bearing 10 is connected to an end of the fluid supply pipe 119. The outlet nozzle of the fluid dispenser 120 is located at a position around the micro-gap 13 between the shaft 11 and the sleeve 12 of the hydrodynamic bearing 10, thus easily dripping the fluid into the micro-gap 13.

The ultrasonic generation container 130 transmits ultrasonic waves to the vacuum vessel 110 and is filled with a predetermined quantity of a medium 131. The vacuum vessel 110 is securely installed on the inner surface of the bottom wall of the ultrasonic generation container 130 using a support unit (not shown) such that the vacuum vessel 110 is spaced apart from the bottom wall of the container 130 by a predetermined distance. The medium 131 is charged in a gap between the vacuum vessel 110 and the ultrasonic generation container 130 and transmits ultrasonic waves to the vacuum vessel 110. The ultrasonic waves are transmitted to the vacuum vessel 110 through only the medium 131, so that vibrations induced by the ultrasonic waves may be applied to the hydrodynamic bearing 10.

The ultrasonic generator 140 generates ultrasonic waves having predetermined frequencies. Preferably, the ultrasonic generator 140 generates ultrasonic waves having frequencies not lower than about 1 kHz, and is closely mounted to the outer surface of the bottom wall of the ultrasonic generation container 130. The ultrasonic generator 140 applies ultrasonic signals produced by an electronic circuit to an ultrasonic vibrator, such as a piezoelectric ceramic, thus generating vibrations and producing ultrasonic waves.

When the ultrasonic waves produced by the ultrasonic generator 140 are transmitted to the medium 131 through the ultrasonic generation container 130, the temperature of the medium 131 is raised, thus repeatedly forming cavities in the medium 131 and removing the cavities from the medium 131. Due to the above-mentioned formation and removal of the cavities in and from the medium 131, a high pressure of about 1,000 atm is produced, which transmits vibrations to the hydrodynamic bearing 10.

The method for filling the hydrodynamic bearing with fluid using the fluid filling system 100 will be described in detail with reference to FIGS. 2 and 3A through 3D.

Figure 2:
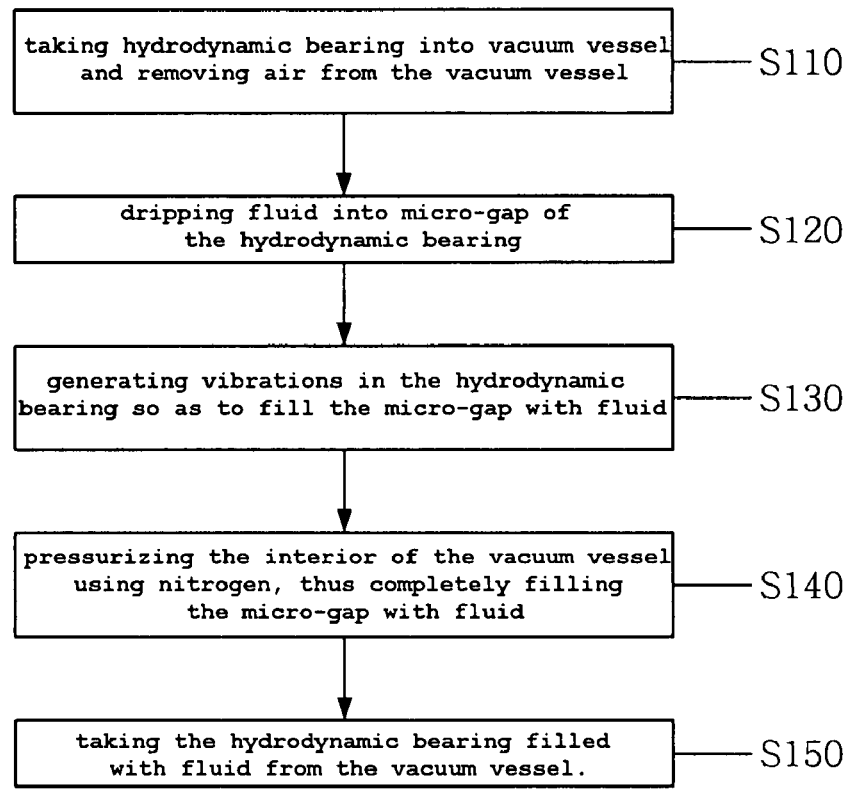
FIG. 2 is a flowchart of a method for filling the hydrodynamic bearing with fluid using the fluid filling system of FIG. 1.

As described in the flowchart of FIG. 2, the fluid filling method of the present invention comprises five steps.

Described in detail, the fluid filling method according to the present invention comprises a first step S110 of taking the hydrodynamic bearing into the vacuum vessel and removing air from the vacuum vessel, a second step S120 of dripping fluid into the micro-gap of the hydrodynamic bearing, a third step S130 of generating vibrations in the hydrodynamic bearing so as to fill the micro-gap with the fluid, a fourth step S140 of pressurizing the interior of the vacuum vessel using nitrogen, thus completely filling the micro-gap with fluid under pressure, and a fifth step S150 of taking the hydrodynamic bearing filled with the fluid from the vacuum vessel.

Figure 3A:
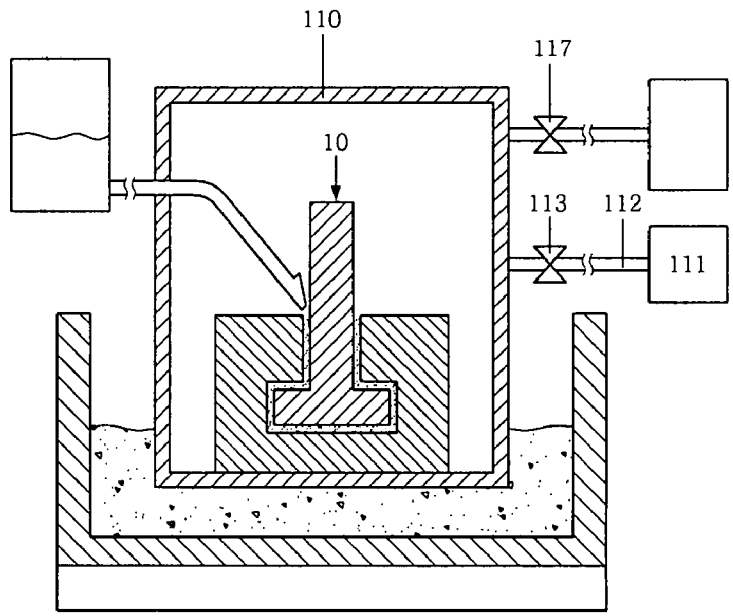
FIGS. 3A through 3D are schematic views illustrating the method for filling the hydrodynamic bearing with fluid according to the flowchart of FIG. 2.

First, at step S110, as shown in FIG. 3A, a hydrodynamic bearing 10 is placed into the vacuum vessel 110 through the opening (not shown) under the condition that both the throttle valve 113 connected to the air exhaust pipe 112 and the throttle valve 117 connected to the nitrogen injection pipe 116 are closed.

Thereafter, the throttle valve 113 connected to the air exhaust pipe 112 is opened and the pump 111 is operated to exhaust air from the vacuum vessel 110 to the atmosphere. In the above state, the ultrasonic generator 140 is operated so as to generate vibrations in the hydrodynamic bearing 10, thus completely exhausting air from the micro-gap 13.

Figure 3B:
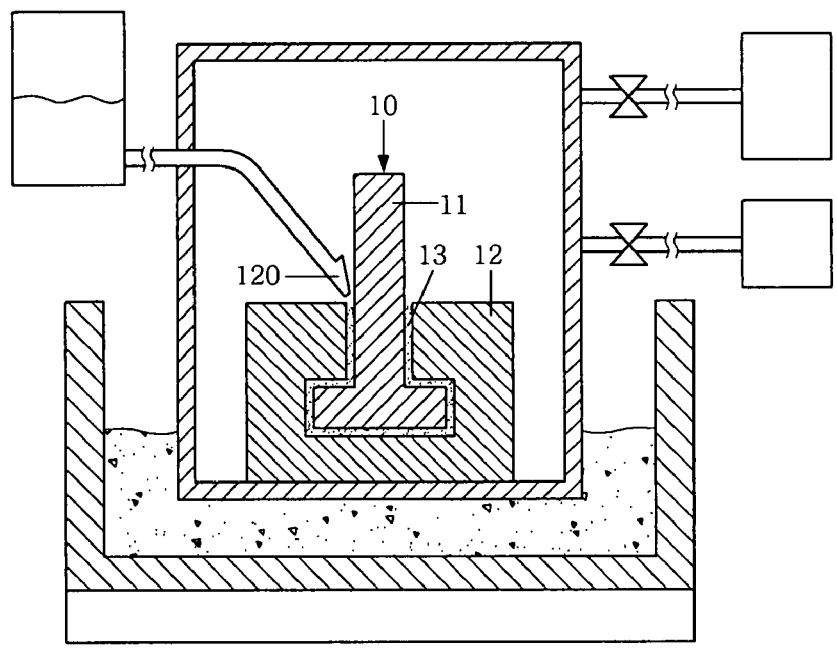

At step S120, as shown in FIG. 3B, fluid is dripped into the micro-gap 13 between the shaft 11 and sleeve 12 of the hydrodynamic bearing 10 using the fluid dispenser 120. In the above state, the hydrodynamic bearing 10 is rotated such that a predetermined amount of fluid can be evenly dripped into the circular micro-gap 13. Part of the fluid dripped into the micro-gap 13 permeates through the micro-gap 13 due to capillary action, while the remaining fluid is left in the dripped state without permeating.

Figure 3C:
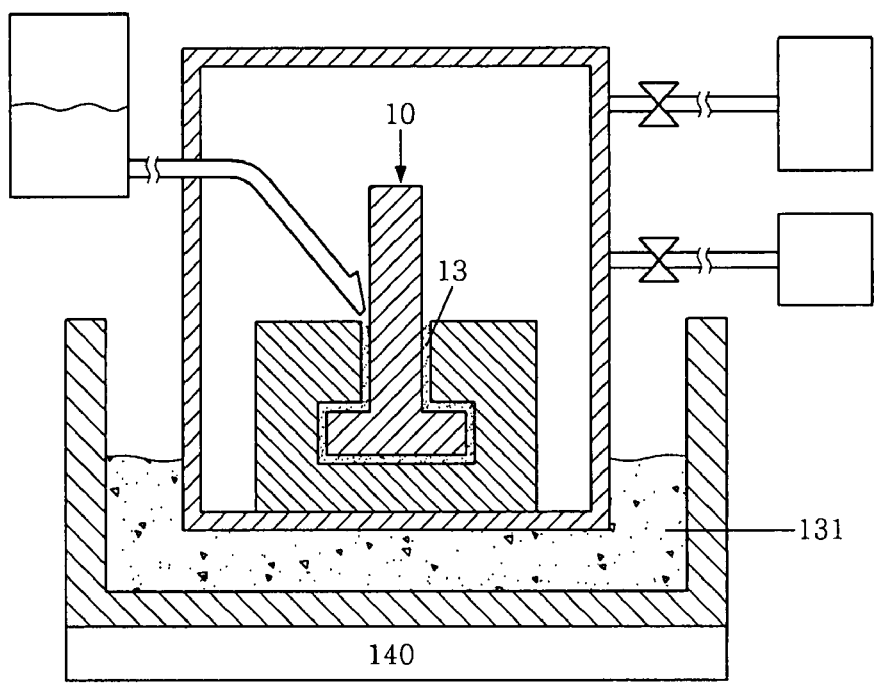

At step S130, as shown in FIG. 3C, the ultrasonic generator 140 is operated to generate vibrations in the hydrodynamic bearing 10 through the medium 131. Thus, the remaining fluid, which has remained in the dripped state without permeating, can easily permeate through the micro-gap 13.

Figure 3D:
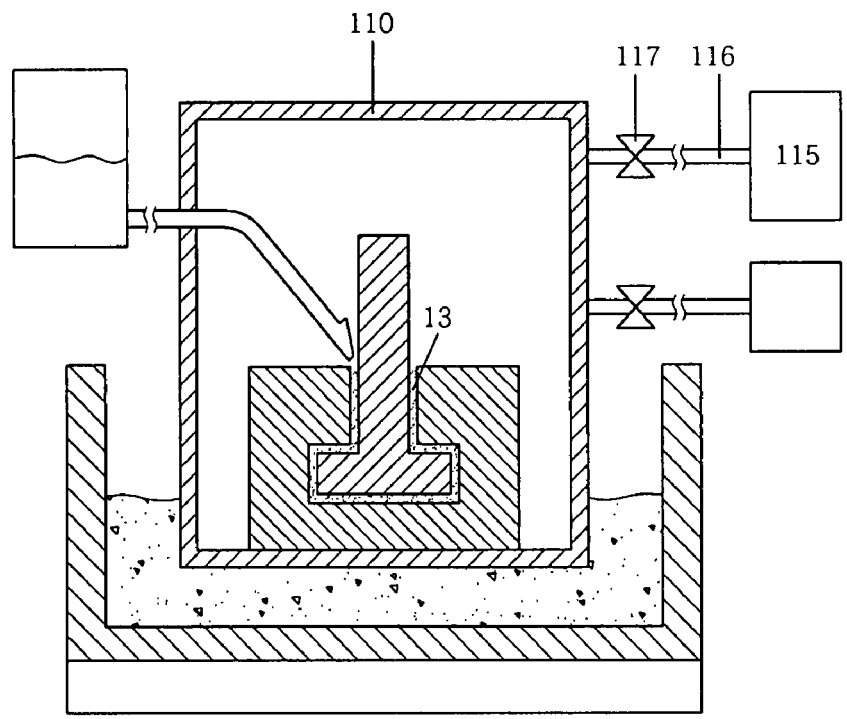
Figure 4A:
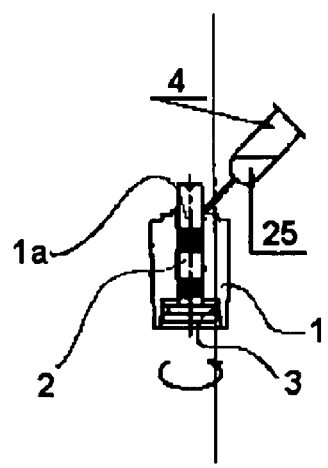
FIGS. 4A through 4D are schematic views illustrating a conventional lubrication oil filling method.
Figure 4B:
Figure 4C:
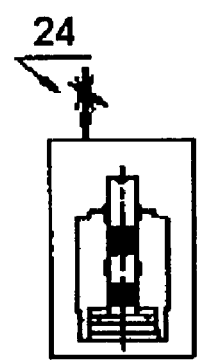
Figure 4D:
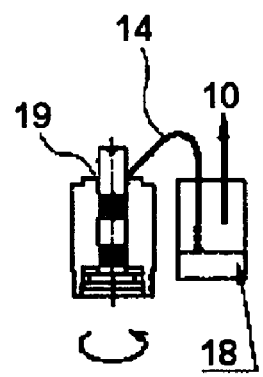

Thereafter, at step S140, as shown in FIG. 3D, the throttle valve 117 connected to the nitrogen storage tank 115 is opened so that nitrogen can be supplied to the vacuum vessel 110 through the nitrogen supply pipe 116. In the above state, the fluid charged in the micro-gap 13 is pressurized to cause the entire micro-gap 13 to be completely filled with the fluid. In the present invention, to pressurize the fluid charged in the micro-gap 13, nitrogen, which does not permeate through the fluid, is used. Thus, no air bubbles are formed in the fluid charged in the gap 13.

At step S150, the hydrodynamic bearing 10, which has been completely filled with fluid, is taken out of the vacuum vessel 110 using a suitable device (not shown).

In the above description, one vacuum vessel 110 is placed in one ultrasonic generation container 130 to fill one hydrodynamic bearing 10 with fluid. However, it should be understood that a plurality of vacuum vessels 110 having respective hydrodynamic bearings 10 may be placed in one ultrasonic generation container 130 to fill the bearings 10 with fluid at the same time.

As is apparent from the above description, the system and method for filling hydrodynamic bearings with fluid according to the present invention provides advantages in that vibrations are generated in the hydrodynamic bearing during the process of exhausting air from the vacuum vessel having the hydrodynamic bearing therein, so that air remaining in the micro-gap between the shaft and sleeve of the hydrodynamic bearing can be completely exhausted outside. Thus, the fluid can be completely charged in the micro-gap between the shaft and sleeve of the hydrodynamic bearing.

Furthermore, during the process of filling the hydrodynamic bearing with fluid, fluid is pressurized using nitrogen which does not permeate through the fluid. Thus, no air bubbles are formed in the fluid.

Unlike the conventional technique, the fluid filling system and method of the present invention do not require that the temperature of the vacuum vessel be maintained at a predetermined point or higher to remove air bubbles from the fluid charged in the micro-gap, and thus the present invention simplifies the construction of the system and makes the fluid filling process easy.

Furthermore, in the present invention, the fluid is pressurized using nitrogen after a sufficient amount of fluid has been completely charged in the micro-gap. Thus, the fluid is not dispersed to the surroundings during the process of pressurizing the fluid, so that the present invention prevents contamination of the surroundings with dispersed fluid.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A system for filling hydrodynamic bearings with fluid, comprising:
    means for receiving therein an object to be filled with the fluid;
    means for exhausting air from the receiving means to an outside;
    means for generating vibrations in the receiving means, and
    a vibrations generation container to receive the receiving means therein with a medium charged in a space between the receiving means and the vibrations generation container to transmit the vibrations to the receiving means,
    wherein the object is filled with the fluid while the object is vibrated by the vibrations generating means.

2. The system for filling hydrodynamic bearings with fluid according to claim 1, further comprising:
    pressurizing means for supplying nitrogen to the receiving means and pressurizing the fluid charged in the object.

3. The system for filling hydrodynamic bearings with fluid according to claim 1, wherein, when air is exhausted from the receiving means through the exhausting means, the object is vibrated by the vibration generating means and air is exhausted from the object.

4. The system for filling hydrodynamic bearings with fluid according to claim 3, further comprising:
    pressurizing means for supplying nitrogen to the receiving means and pressurizing the fluid charged in the object.

5. A system for filling hydrodynamic bearings with fluid, comprising:
- a vacuum vessel to receive therein a hydrodynamic bearing to be filled with the fluid;
- a pump hermetically connected to the vacuum vessel and exhausting air from the vacuum vessel to an outside;
- an ultrasonic generator to generate vibrations in the vacuum vessel;
- a fluid dispenser hermetically connected to the vacuum vessel and dripping the fluid into the hydrodynamic bearing, and
- an ultrasonic generation container to receive the vacuum vessel therein with a medium charged in a space between the vacuum vessel and the ultrasonic generation container to transmit the ultrasonic waves to the vacuum vessel; and
- wherein the hydrodynamic bearing is filled with the dripped fluid while the hydrodynamic bearing is vibrated by the ultrasonic generator.

6. The system for filling hydrodynamic bearings with fluid according to claim 5
- the ultrasonic generation container being installed so as to be in contact with an upper surface of the ultrasonic generator and the vacuum vessel being spaced apart from an inner surface of a bottom wall of the ultrasonic generation container by a predetermined distance.

7. The system for filling hydrodynamic bearings with fluid according to claim 5, wherein the ultrasonic waves generated by the ultrasonic generator have a frequency band of not lower than 1 kHz.

8. The system for filling hydrodynamic bearings with fluid according to claim 5, wherein, when the air is exhausted from the vacuum vessel by the pump, the hydrodynamic bearing is vibrated by the ultrasonic generator and air is exhausted from a micro-gap between a shaft and a sleeve of the hydrodynamic bearing to the outside.

9. The system for filling hydrodynamic bearings with fluid according to claim 8:
- the ultrasonic generation container being installed so as to be in contact with an upper surface of the ultrasonic generator and the vacuum vessel being spaced apart from an inner surface of a bottom wall of the ultrasonic generation container by a predetermined distance.

10. The system for filling hydrodynamic bearings with fluid according to claim 8, wherein the ultrasonic waves generated by the ultrasonic generator have a frequency band of not lower than 1 kHz.

11. The system for filling hydrodynamic bearings with fluid according to claim 5, further comprising:
- a nitrogen storage tank to supply nitrogen to the vacuum vessel and pressurize the fluid charged in the hydrodynamic bearing.

12. The system for filling hydrodynamic bearings with fluid according to claim 11:
- the ultrasonic generation container being installed so as to be in contact with an upper surface of the ultrasonic generator and the vacuum vessel being spaced apart from an inner surface of a bottom wall of the ultrasonic generation container by a predetermined distance.

13. The system for filling hydrodynamic bearings with fluid according to 11, wherein the ultrasonic waves generated by the ultrasonic generator have a frequency band of not lower than 1 kHz.

14. A method for filling hydrodynamic bearings with fluid, comprising:
- taking a hydrodynamic bearing into a vacuum vessel and removing air from the vacuum vessel while generating vibrations in the hydrodynamic bearing;
- dripping fluid into a micro-gap of the hydrodynamic bearing using a fluid dispenser provided in the vacuum vessel;
- generating vibrations in the hydrodynamic bearing using ultrasonic waves generated by an ultrasonic generator, thus sufficiently filling the micro-gap with the dripped fluid;
- supplying nitrogen into the vacuum vessel and pressurizing the fluid, thus completely filling the micro-gap with the fluid,
- charging a medium in a gap between the vacuum vessel and the ultrasonic generator; and
- transmitting the ultrasonic waves generated by the ultrasonic generator both to the vacuum and to the hydrodynamic bearing through the medium.

15. The method for filling hydrodynamic bearings with fluid according to claim 14, wherein the ultrasonic waves generated by the ultrasonic generator have a frequency band of not lower than 1 kHz.

16. The method for filling hydrodynamic bearings with fluid according to claim 14, wherein part of the fluid which has been dripped into the micro-gap at the step of dripping the fluid permeates through the micro-gap due to capillary action, while a remaining part of the dripped fluid permeates through the micro-gap when the hydrodynamic bearing is vibrated at the step of generating vibrations.

17. The method for filling hydrodynamic bearings with fluid according to claim 16, wherein the ultrasonic waves generated by the ultrasonic generator have a frequency band of not lower than 1 kHz.

18. A system for filling hydrodynamic bearings with fluid, comprising:
- a receiving part to receive therein an object to be filled with the fluid;
- an exhausting air part to exhaust an air from the receiving part to an outside;
- a vibration generator to generate a vibration in the receiving part, and
- a vibration generator container to receive the receiving part therein with a medium charged in a space between the receiving part and vibration generator container to transmit the vibration to the receiving part,
- wherein the object is filled with the fluid while the object is vibrated by the vibration generator.

* * * * *

UNITED STATES PATENT AND TRADEMARK OFFICE
CERTIFICATE OF CORRECTION

| | |
|---|---|
| PATENT NO. | : 7,753,088 B2 |
| APPLICATION NO. | : 11/700778 |
| DATED | : July 13, 2010 |
| INVENTOR(S) | : Tae Hyeong Lim et al. |

It is certified that error appears in the above-identified patent and that said Letters Patent is hereby corrected as shown below:

Column 7, Line 21 in Claim 6, delete "claim 5" and insert -- claim 5: --, therefor.

Column 8, Line 4 in Claim 13, delete "to 11," and insert -- to claim 11, --, therefor.

Signed and Sealed this
Seventh Day of June, 2011

David J. Kappos
*Director of the United States Patent and Trademark Office*